United States Patent
Kitahara et al.

(10) Patent No.: US 11,095,086 B2
(45) Date of Patent: Aug. 17, 2021

(54) AMPLIFICATION OPTICAL FIBER, FIBER LASER DEVICE, AND OPTICAL RESONATOR

(71) Applicant: FUJIKURA LTD., Tokyo (JP)

(72) Inventors: Rintaro Kitahara, Chiba (JP); Hidenori Miyauchi, Chiba (JP)

(73) Assignee: Fujikura Ltd., Tokyo (JP)

( * ) Notice: Subject to any disclaimer, the term of this patent is extended or adjusted under 35 U.S.C. 154(b) by 373 days.

(21) Appl. No.: 16/208,142

(22) Filed: Dec. 3, 2018

(65) Prior Publication Data

US 2020/0028314 A1 Jan. 23, 2020

(30) Foreign Application Priority Data

Mar. 30, 2018 (JP) .............................. JP2018-069801

(51) Int. Cl.
*H01S 3/00* (2006.01)
*H01S 3/067* (2006.01)
*H01S 3/16* (2006.01)

(52) U.S. Cl.
CPC ........ *H01S 3/06716* (2013.01); *H01S 3/0672* (2013.01); *H01S 3/1618* (2013.01)

(58) Field of Classification Search
CPC ............... H01S 3/1618; H01S 3/06733; H01S 3/06716; H01S 3/0672; H01S 3/08045; H01S 3/0675; H01S 3/094053; H01S 3/06754; H01S 3/176; H01S 3/09415; H01S 2301/03
USPC ...................................................... 359/341.1
See application file for complete search history.

(56) References Cited

U.S. PATENT DOCUMENTS

| 5,508,842 | A | * | 4/1996 | Takeda | ................ | H01S 3/06708 |
| | | | | | | 359/337 |
| 2011/0026106 | A1 | | 2/2011 | Nakaguma et al. | | |
| 2012/0262780 | A1 | * | 10/2012 | Bai | ................... | H01S 3/094069 |
| | | | | | | 359/337.11 |
| 2014/0029906 | A1 | | 1/2014 | Mukasa | | |
| 2016/0043525 | A1 | * | 2/2016 | Ichige | ..................... | H01S 3/091 |
| | | | | | | 359/341.32 |
| 2016/0223743 | A1 | * | 8/2016 | Sillard | ................. | G02B 6/0288 |

FOREIGN PATENT DOCUMENTS

| EP | 2352209 | A1 | 8/2011 | | |
| EP | 2743742 | A1 | 6/2014 | | |
| JP | 2006078543 | A | * | 4/2006 | ............... G02B 6/02 |

(Continued)

OTHER PUBLICATIONS

Final Rejection issued in corresponding Japanese Patent Application No. 2018-069801 dated Nov. 27, 2018 (3 pages).

(Continued)

*Primary Examiner* — Mark Hellner
(74) *Attorney, Agent, or Firm* — Osha Bergman Watanabe & Burton LLP

(57) ABSTRACT

An amplification optical fiber includes: a core; an inner cladding having a refractive index lower than a refractive index of the core, wherein an active element pumped by pumping light is entirely doped to the core, and a relative effective refractive index difference of light in an LP01 mode is greater than or equal to 0.05% and a relative effective refractive index difference of light in an LP21 mode is less than 0.05% in light propagating through the core.

11 Claims, 7 Drawing Sheets

(56) References Cited

FOREIGN PATENT DOCUMENTS

| | | | |
|---|---|---|---|
| JP | 2007-139857 A | 6/2007 | |
| JP | 2018-6596 A | 1/2018 | |
| JP | 2018190834 A * | 11/2018 | ......... H01S 3/06779 |
| WO | 91/07690 A1 | 5/1991 | |
| WO | 2003/067723 A1 | 8/2003 | |
| WO | WO2003/067723 A1 | 6/2005 | |
| WO | 2010/055696 A1 | 5/2010 | |

OTHER PUBLICATIONS

Office Action issued in corresponding Japanese Patent Application No. 2018-069801 dated Jun. 26, 2018 (3 pages).

* cited by examiner

… (1)

AMPLIFICATION OPTICAL FIBER, FIBER LASER DEVICE, AND OPTICAL RESONATOR

BACKGROUND OF THE INVENTION

The present invention relates to an amplification optical fiber, a fiber laser device, and an optical resonator that are capable of amplifying light while preventing deterioration of a beam quality.

A fiber laser device has an excellent light condensing property, has a high power density, and is capable of obtaining light having a small beam spot. Thus, a fiber laser device is used in various fields such as a laser processing field and a medical field. In such a fiber laser device, higher output of light to be emitted is achieved. However, when the power density of light inside an optical fiber increases, light wavelength conversion caused by stimulated Raman scattering is likely to occur, and light having an unintended wavelength may be emitted. In this case, amplification of light having a wavelength that should be amplified in design may become unstable, which may result in unstable output.

As a method for preventing stimulated Raman scattering in an optical fiber, there is a method of increasing the effective area of light propagating through a core to reduce the energy density of light inside the core. In order to increase the effective area, there are a method of increasing the diameter of the core and a method of reducing a relative refractive index difference of the core with respect to a cladding. However, when the diameter of the core is increased, a light trapping force of the core increases. Thus, light propagating through the optical fiber becomes a multimode, and the beam quality of light to be emitted tends to deteriorate.

Patent Literature 1 describes an amplification optical fiber in which a gain medium which is pumped by pumping light is doped to the center of the core, and an absorption medium which absorbs a signal light is doped to the outer periphery of the core. With such a configuration, light in a fundamental mode is amplified rather than light in a higher order mode. As a result, it is possible to prevent deterioration of the beam quality.

[Patent Literature 1] WO 2003/067723 A1

However, in the amplification optical fiber described in Patent Literature 1, since the gain medium is doped to a part of the core, the efficiency of amplification tends to be lower than that in the case where the gain medium is entirely doped to the core. Thus, there is a demand for an amplification optical fiber that prevents reduction in the beam quality by another method. Note that the beam quality is indicated by, for example, $M^2$ (M square).

SUMMARY OF THE INVENTION

One or more embodiments of the present invention provide an amplification optical fiber, a fiber laser device, and an optical resonator that are capable of preventing deterioration of the beam quality while preventing reduction in the light amplification efficiency.

An amplification optical fiber according to one or more embodiments of the present invention includes: a core; a cladding having a refractive index lower than a refractive index of the core, wherein an active element pumped by pumping light is entirely doped to the core, and a relative effective refractive index difference of light in an LP01 mode is 0.05% or more and a relative effective refractive index difference of light in an LP21 mode is less than 0.05% in light propagating through the core.

In the amplification optical fiber according to one or more embodiments of the present invention, since the active element is entirely doped to the core, it is possible to efficiently amplify light propagating through the core as compared to the case as described in Patent Literature 1 where the active element is doped to a part of the core. Thus, it is possible to reliably prevent reduction in the light amplification efficiency as compared to the amplification optical fiber described in Patent Literature 1. Further, in the amplification optical fiber in which the active element is doped to the entire core, the amplification factor of light in an LP mode having a relative effective refractive index difference of 0.05% or more is high, and the amplification factor of light in an LP mode having a relative effective refractive index difference of less than 0.05% is low. Thus, according to the above optical fiber, light in the LP01 mode is amplified, and the amplification of light in the LP21 mode is suppressed. Further, the relative effective refractive index difference can be understood as an index of light trapped inside the core. Thus, when the relative effective refractive index difference of light in the LP21 mode is less than 0.05%, the relative effective refractive index difference of light in a higher order mode than the LP21 mode is also less than 0.05%. Thus, according to the above amplification optical fiber, it is possible to suppress the amplification of light in the LP21 or higher order mode and prevent deterioration of the beam quality of light emitted from the amplification optical fiber.

In one or more embodiments, a relative effective refractive index difference of light in an LP11 mode is less than 0.05% in light propagating through the core.

In this case, it is possible to suppress the amplification of light in the LP11 or higher order mode. Thus, it is possible to more reliably prevent deterioration of the beam quality of light emitted from the amplification optical fiber.

Alternatively, in one or more embodiments, a relative effective refractive index difference of light in an LP11 mode is 0.05% or more in light propagating through the core.

In this case, each of light in the LP01 mode and light in the LP11 mode can be amplified. Thus, it is possible to emit high-power light from the amplification optical fiber as compared to the case where only light in the LP01 mode is amplified while preventing deterioration of the beam quality of light to be emitted.

Furthermore, in one or more embodiments, a refractive index profile of the core corresponds to a concentration profile of the active element.

In this case, since the refractive index profile of the core corresponds to the concentration profile of the active element, the concentration of the active element is higher in a region having a higher refractive index in the core. Light has a property of gathering in a region having a higher refractive index in the core. Thus, light can be more efficiently amplified in a region where more beams of light gather due to a high concentration of the active element.

Moreover, in one or more embodiments, an effective area of light in the LP01 mode propagating through the core is 200 μm² or more.

When light in the LP01 mode having such an effective area propagates, it is possible to prevent the occurrence of stimulated Raman scattering and prevent the emission of light having a wavelength different from an intended wavelength.

In this case, in one or more embodiments, the effective area of light in the LP01 mode propagating through the core is 400 µm² or less.

When the effective area of light in the LP01 mode is 400 µm² or less, it is possible to prevent light in the LP01 mode propagating through the optical fiber from shifting to light in a higher order mode and more reliably prevent deterioration of the beam quality.

In addition, in one or more embodiments, a relative refractive index difference of the core is 0.08% or more.

When the relative refractive index difference of the core is 0.08% or more, it is possible to stably amplify light with high resistance to disturbance even in the amplification optical fiber used in a bent state. Further, it is possible to easily make the relative effective refractive index difference of light in the LP01 mode 0.05% or more.

Furthermore, the active element may be ytterbium.

When at least ytterbium is doped to the core, it is possible to amplify at least part of light having wavelengths of approximately 1000 nm to 1100 nm.

Moreover, a diameter of the core may be 23 µm or more and 27 µm or less.

Further, a fiber laser device according to one or more embodiments of the present invention includes: the amplification optical fiber according to any one of the above aspects; and a pumping light source that emits the pumping light that enters the amplification optical fiber.

As described above, the amplification optical fiber according to one or more embodiments of the present invention is capable of emitting light in which deterioration of the beam quality is prevented while preventing reduction in the light amplification efficiency. Thus, the fiber laser device according to one or more embodiments of the present invention is capable of emitting light in which deterioration of the beam quality is prevented while preventing reduction in the light amplification efficiency by using the amplification optical fiber having such a configuration.

Further, an optical resonator according to one or more embodiments of the present invention includes: the amplification optical fiber according to any one of the above aspects; a first mirror that is optically coupled to the core of the amplification optical fiber on one side of the amplification optical fiber and reflects at least part of light having some wavelengths emitted by the active element in a pumped state; and a second mirror that is optically coupled to the core of the amplification optical fiber on the other side of the amplification optical fiber and reflects at least part of light having some wavelengths reflected by the first mirror with a reflectivity lower than a reflectivity of the first mirror.

As described above, the amplification optical fiber according to one or more embodiments of the present invention is capable of emitting light in which deterioration of the beam quality is prevented while preventing reduction in the light amplification efficiency. Thus, the optical resonator according to one or more embodiments of the present invention is capable of emitting light in which deterioration of the beam quality is prevented while preventing reduction in the light amplification efficiency by using the amplification optical fiber having such a configuration.

As described above, one or more embodiments of the present invention provides the amplification optical fiber, the fiber laser device, and the optical resonator that are capable of preventing deterioration of the beam quality while preventing reduction in the light amplification efficiency.

DETAILED DESCRIPTION OF THE INVENTION

Hereinbelow, embodiments of an optical fiber and a laser device according to the present invention will be described in detail with reference to the drawings. The embodiments described below as examples are not used to limitedly interpret the present invention, but used to facilitate the understanding of the present invention. The present invention can be modified and improved without departing from the scope thereof. Note that, in order to facilitate the understanding, the scale of each drawing may differ from the scale in the following description.

Figure 1:
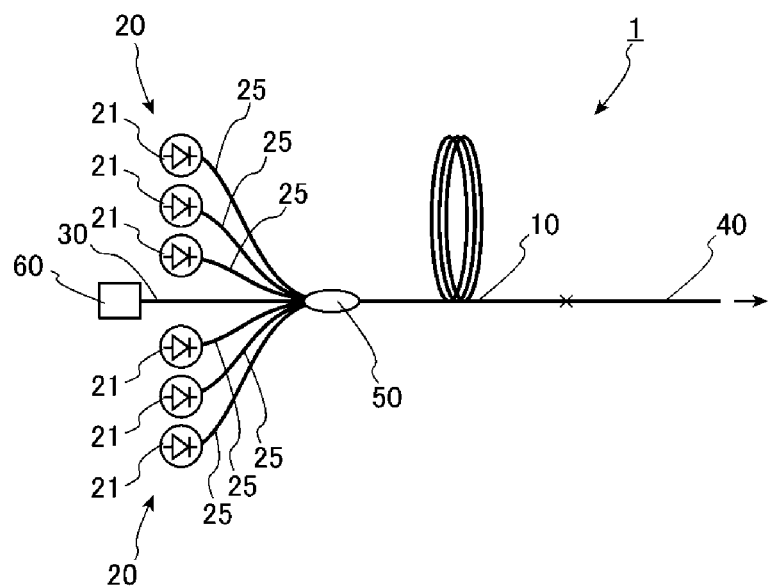
FIG. 1 is a diagram illustrating a fiber laser device according to one or more embodiments of the present invention.

FIG. 1 is a diagram illustrating a laser device according to one or more embodiments. As illustrated in FIG. 1, a fiber laser device 1 of one or more embodiments is a master oscillator power amplifier (MO-PA) fiber laser device. The fiber laser device 1 is provided with, as main elements, an amplification optical fiber 10, a pumping light source 20, a first optical fiber 30, a second optical fiber 40, an optical combiner 50, and a seed light source 60.

Figure 2:
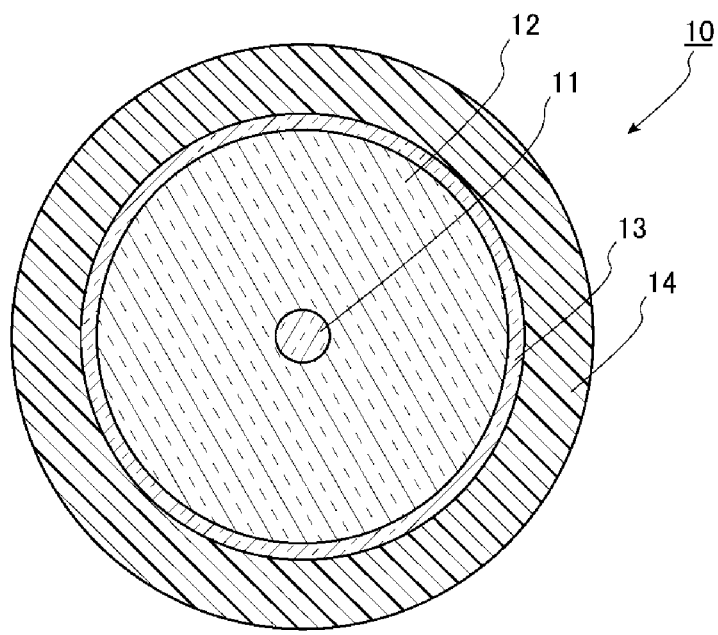
FIG. 2 is a sectional view of an amplification optical fiber illustrated in FIG. 1.

FIG. 2 is a sectional view of the amplification optical fiber 10 illustrated in FIG. 1. As illustrated in FIG. 2, the amplification optical fiber 10 is provided with, as main elements, a core 11, an inner cladding 12 which is one form of a cladding surrounding the outer peripheral face of the core 11 with no gap, an outer cladding 13 which covers the outer peripheral face of the inner cladding 12, and a covering layer 14 which covers the outer cladding 13. That is, the amplification optical fiber 10 has a double cladding structure. The refractive index of the inner cladding 12 is lower than the refractive index of the core 11, and the refractive index of the outer cladding 13 is lower than the refractive index of the inner cladding 12.

The core 11 includes quartz glass with at least an active element such as ytterbium (Yb), which is pumped by pumping light emitted from the pumping light source 20 as described below, doped. The active element may include a rare earth element other than ytterbium. Examples of the rare earth element include, in addition to ytterbium, thulium (Tm), cerium (Ce), neodymium (Nd), europium (Eu), and erbium (Er). Further, the active element may include, other than the rare earth element, bismuth (Bi). The active element generally has a property as a dopant which increases the refractive index of the core 11. Further, a dopant for adjusting the refractive index such as germanium (Ge), phosphorus (P), aluminum (Al), titanium (Ti), germanium oxide ($GeO_2$), chlorine (Cl), boron (B), or fluorine (F) may be doped to the core 11 in addition to the active element. Further, when the refractive index of the core 11 is higher than the refractive index of quartz glass, the inner cladding 12 includes, for example, quartz with no dopant doped or quartz glass with a dopant for reducing the refractive index such as fluorine (F) or boron (B) doped. Further, when the refractive index of the core 11 is not so different from the refractive index of quartz glass, the inner cladding 12 includes quartz glass with a dopant for reducing the refractive index such as fluorine (F) or boron (B) doped. Further, the outer cladding 13 has a refractive index lower than the refractive index of the inner cladding 12 and includes resin or quartz glass. Examples of the resin include an ultraviolet curable resin and a thermosetting resin, and the quartz glass includes, for example, quartz glass with a dopant for reducing the refractive index so as to be further lower than the refractive index of the inner cladding 12 such as fluorine (F) or boron (B) doped. Further, examples of the material constituting the covering layer 14 include an ultraviolet curable resin and a thermosetting resin. When the outer cladding 13 is made of resin, the covering layer 14 is made of an ultraviolet curable resin or a thermosetting resin that differs from the resin constituting the outer cladding 13.

Further, the amplification optical fiber 10 is a few-mode fiber. In addition to light in the LP01 mode as a fundamental mode, light in a higher order mode equal to or higher than the secondary LP mode propagates through the core 11. Examples of the light in the higher order mode include light in the LP11 mode and light in the LP21 mode. The wavelength of the light is, for example, 1060 nm.

The pumping light source 20 includes a plurality of laser diodes 21. In one or more embodiments, each of the laser diodes 21 is, for example, a Fabry-Perot semiconductor laser made of a GaAs semiconductor and emits pumping light having a center wavelength of 915 nm or 960 nm. Further, each of the laser diodes 21 of the pumping light source 20 is connected to an optical fiber 25, and the pumping light emitted from the laser diode 21 propagates through the optical fiber 25 as, for example, multimode light.

Each of the optical fibers 25 is connected to one end of the amplification optical fiber 10 at the optical combiner 50. Specifically, a core of each of the optical fibers 25 and the inner cladding 12 of the amplification optical fiber 10 are connected to each other so that the core of each of the optical fibers 25 is optically coupled to the inner cladding 12 of the amplification optical fiber 10. Thus, the pumping light emitted from each of the laser diodes 21 enters the inner cladding 12 of the amplification optical fiber 10 through the optical fiber 25 and mainly propagates through the inner cladding 12.

In one or more embodiments, the first optical fiber 30 is a single mode fiber. The first optical fiber 30 is provided with, as main elements, a core, a cladding which surrounds the outer peripheral face of the core with no gap, and a covering layer which covers the cladding. For example, the diameter of the core is equal to or less than the diameter of the core 11 of the amplification optical fiber 10, and the refractive index of the core is substantially equal to the refractive index of the core 11 of the amplification optical fiber 10. Further, an active element such as ytterbium is not doped to the core of the first optical fiber 30. Further, for example, the cladding of the first optical fiber 30 has a configuration similar to the configuration of the inner cladding 12 except that the diameter of the cladding of the first optical fiber 30 is smaller than the diameter of the inner cladding 12 of the amplification optical fiber 10. For example, the covering layer of the first optical fiber 30 has a configuration similar to the configuration of the covering layer 14 of the amplification optical fiber 10.

The first optical fiber 30 is connected to the one end of the amplification optical fiber 10 at the optical combiner 50. Specifically, the amplification optical fiber 10 and the first optical fiber 30 are connected to each other so that the core of the first optical fiber 30 is optically coupled to the core 11 of the amplification optical fiber 10. Thus, light propagating through the first optical fiber 30 enters the core 11 of the amplification optical fiber 10 and propagates through the core 11.

The seed light source 60 is connected to the first optical fiber 30 at the side opposite to the side connected to the amplification optical fiber 10. The seed light source 60 includes, for example, a laser diode or a fiber laser. The seed light source 60 is configured to emit light having a wavelength of, for example, 1060 nm or 1085 nm.

The second optical fiber 40 has a configuration similar to the configuration of the first optical fiber 30 except that the diameter of a core of the second optical fiber 40 is equal to the diameter of the core 11 of the amplification optical fiber 10 and the diameter of a cladding of the second optical fiber 40 is equal to the diameter of the inner cladding 12 of the amplification optical fiber 10. Thus, the second optical fiber 40 of one or more embodiments is a few-mode fiber and capable of propagating light similar to the light propagated by the core 11 of the amplification optical fiber 10. The second optical fiber 40 is connected to the other end of the amplification optical fiber 10 so that the core 11 of the amplification optical fiber 10 and the core of the second optical fiber 40 are optically coupled to each other. Thus, light in the few-mode propagating through the core 11 of the amplification optical fiber 10 propagates though the core of the second optical fiber 40 while being kept in the few-mode. In one or more embodiments, nothing is particularly connected to the second optical fiber 40 at the other end opposite to the amplification optical fiber side. However, a glass rod may be connected to the other end of the second optical fiber 40.

Next, the action of the fiber laser device 1 will be described.

First, pumping light is emitted from each of the laser diodes 21 of the pumping light source 20. The pumping light enters the inner cladding 12 of the amplification optical fiber 10 through the optical fiber 25 and mainly propagates through the inner cladding 12. The pumping light propagating through the inner cladding 12 pumps the active element doped to the core 11 when passing through the core 11. Light having a predetermined wavelength is emitted from the seed light source 60 with the active element pumped in this manner. The light emitted from the seed light source 60 enters the core 11 of the amplification optical fiber 10 through the core of the first optical fiber 30 and propagates through the core 11. The active element causes stimulated emission with the light, which amplifies the light propagating through the core 11. The amplified light is emitted from the core 11 of the amplification optical fiber 10, propagates through the core of the second optical fiber 40, and is emitted from the second optical fiber.

Next, the amplification optical fiber 10 will be described in more detail.

First, a relative effective refractive index difference of light will be described. The relative effective refractive index difference $\Delta n_{\textit{eff}}$ of light in each LP mode propagating through the core of the optical fiber is defined by the following formula (1).

$$\Delta n_{\textit{eff}} = \frac{n_{\textit{eff}}^2 - n_{\textit{clad}}^2}{2 n_{\textit{eff}}^2} \quad (1)$$

In the above formula (1), $n_{\textit{eff}}$ denotes the effective refractive index of light in each LP mode, and $n_{\textit{clad}}$ denotes the refractive index of the cladding. The effective refractive index $n_{\textit{eff}}$ of light in each LP mode is a value determined by an electric field profile of light in each LP mode and can take values from the refractive index $n_{\textit{core}}$ of the core to the refractive index $n_{\textit{clad}}$ of the cladding. When many beams of light are trapped inside the core, and leakage of light to the cladding is small, the effective refractive index $n_{\textit{eff}}$ approaches the refractive index $n_{\textit{core}}$ of the core. When a few beams of light are trapped inside the core, and leakage of light to the cladding is large, the effective refractive index $n_{\textit{eff}}$ approaches the refractive index $n_{\textit{clad}}$ of the cladding. Thus, the relative effective refractive index difference $\Delta n_{\textit{eff}}$ can be understood as an index of light trapped inside the core.

Further, the amplification factor of light in each mode propagating through the amplification optical fiber 10 is affected by overlapping between a region to which the active element is doped and light. As described above, in one or more embodiments, the active element is doped to the entire core 11. Thus, light trapped in the core 11 with a higher ratio has a higher amplification factor. Thus, light in a mode having a larger relative effective refractive index difference $\Delta n_{\textit{eff}}$ has a higher amplification factor. Further, a refractive index profile of the core 11 may correspond to a concentration profile of the active element doped to the core 11. That is, the concentration of the active element may be higher in a region having a higher refractive index in the core 11. Light has a property of gathering in a region having a higher refractive index in the core. Thus, light can be more efficiently amplified in a region where more beams of light gather due to a high concentration of the active element.

Figure 3:
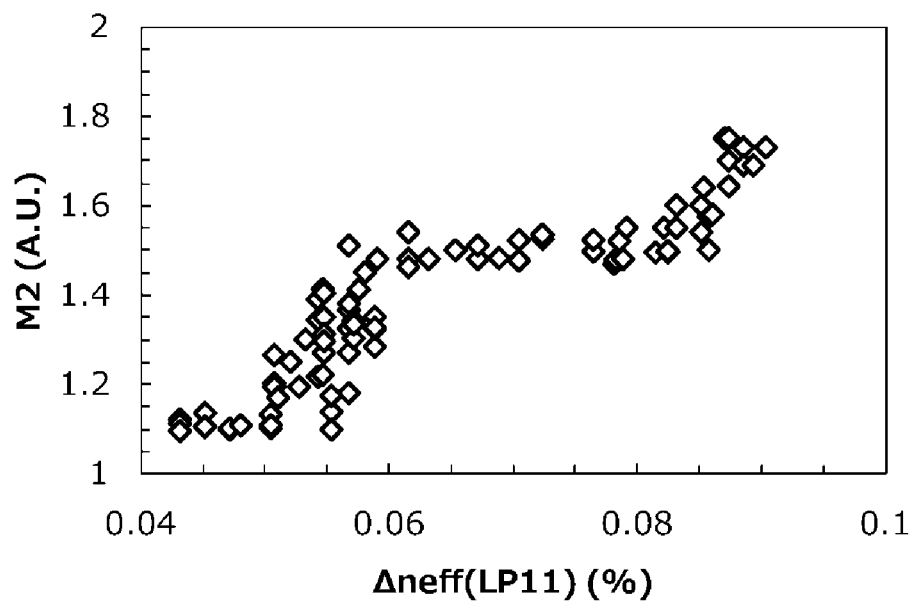
FIG. 3 is a diagram illustrating the relationship between the relative effective refractive index difference of light in the LP11 mode propagating through a core of the amplification optical fiber and a beam quality of light emitted from the amplification optical fiber according to one or more embodiments.

FIG. 3 is a diagram illustrating the relationship between the relative effective refractive index difference $\Delta n_{\textit{eff(LP11)}}$ of light in the LP11 mode propagating through the core 11 of the amplification optical fiber 10 and a beam quality $M^2$ of light emitted from the amplification optical fiber 10. The fiber laser device 1 illustrated in FIG. 1 in which the second optical fiber 40 is omitted is used to measure the relationship. A plurality of laser diodes 21 each of which emits light having a wavelength of 960 nm is used as the pumping light source 20. A light source which emits light having a wavelength of 1085 nm is used as the seed light source 60. Further, an amplification optical fiber including the core 11 with ytterbium doped is used as the amplification optical fiber 10. In the measurement, a plurality of amplification optical fibers 10 each of which includes the core 11 having a diameter of 23 μm to 27 μm and a relative refractive index difference of 0.08% to 0.14% is used. Note that, in the amplification optical fiber 10, a region having a relative refractive index difference of more than 0.02% is defined as the core 11, and the diameter of the core 11 is determined as described above.

As is obvious from FIG. 3, when the relative effective refractive index difference $\Delta n_{\textit{eff(LP11)}}$ of light in the LP11 mode is less than 0.05%, the beam quality $M^2$ is approximately 1.1. Thus, it can be considered that the amplification of light in the LP11 mode is suppressed when the relative effective refractive index difference $\Delta n_{\textit{eff(LP11)}}$ of light in the LP11 mode is less than 0.05%. On the other hand, it can be understood that when the relative effective refractive index difference $\Delta n_{\textit{eff(LP11)}}$ of light in the LP11 mode becomes approximately 0.05% or more, the beam quality $M^2$ is deteriorated to approximately 1.5. This is because when the relative effective refractive index difference $\Delta n_{\textit{eff(LP11)}}$ of light in the LP11 mode becomes 0.05% or more, the ratio of light in the LP11 mode trapped inside the core increases, and light in the LP11 mode is largely amplified. Further, it can be understood that when the relative effective refractive index difference $\Delta n_{\textit{eff(LP11)}}$ of light in the LP11 mode becomes 0.088% or more, the beam quality $M^2$ is further deteriorated to approximately 1.8. This is because the ratio of light in the LP21 mode trapped inside the core 11 increases, and light in the LP21 mode is largely amplified.

Figure 4:
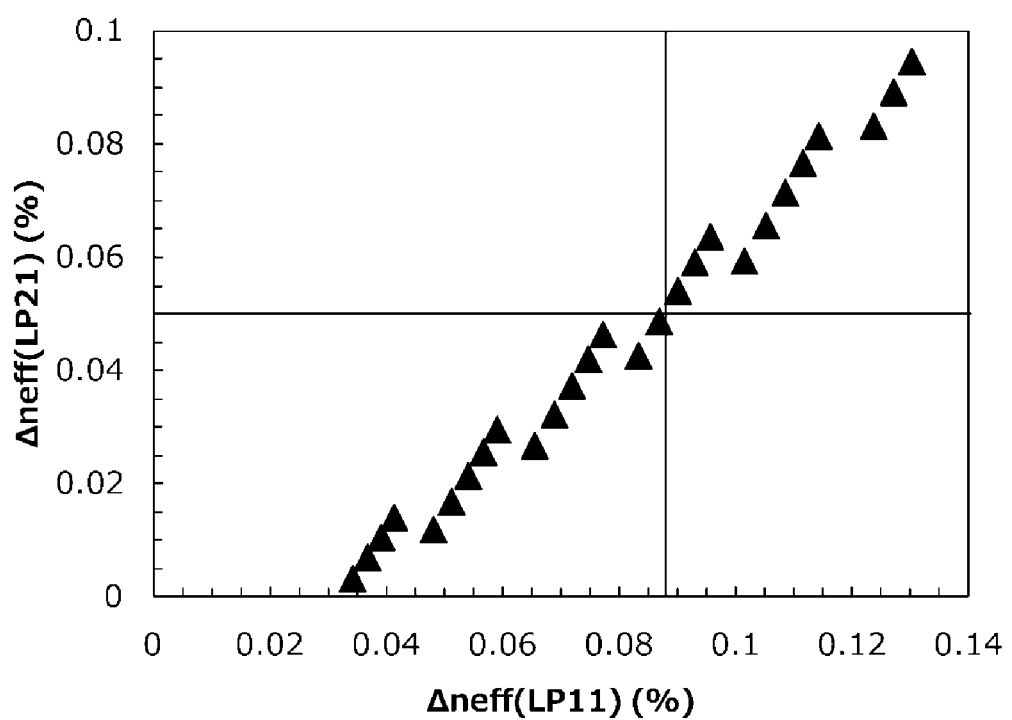
FIG. 4 is a diagram illustrating the relationship between the relative effective refractive index difference of light in the LP11 mode and the relative effective refractive index difference of light in the LP21 mode by a simulation according to one or more embodiments.

FIG. 4 is a diagram illustrating the relationship between the relative effective refractive index difference $\Delta n_{\textit{eff(LP11)}}$ of light in the LP11 mode and the relative effective refractive index difference $\Delta n_{\textit{eff(LP21)}}$ of light in the LP21 mode by a simulation. In the calculation of the relationship, the optical fiber is an optical fiber having a step-index refractive index profile in which the diameter of the core is 23 μm to 27 μm and the relative refractive index difference of the core is 0.08% to 0.14%. As illustrated in FIG. 4, when the relative effective refractive index difference $\Delta n_{\textit{eff(LP11)}}$ of light in the LP11 mode becomes 0.088% or more, the relative effective refractive index difference $\Delta n_{\textit{eff(LP21)}}$ of light in the LP21 mode becomes 0.05% or more. The value is calculated by obtaining an approximate curve from each plot. That is, it can be understood that the reason why the beam quality $M^2$ is reduced when the relative effective refractive index difference $\Delta n_{\textit{eff(LP21)}}$ of light in the LP11 mode is 0.088% or more in FIG. 3 is that the relative effective refractive index difference $\Delta n_{\textit{eff(LP21)}}$ of light in the LP21 mode becomes 0.05% or more and light in the LP21 mode is largely amplified. Accordingly, light in the LP mode having a relative effective refractive index difference $\Delta n_{\textit{eff}}$ of 0.05% or more is amplified, and the amplification of light in the LP mode having a relative effective refractive index difference $\Delta n_{\textit{eff}}$ of less than 0.05% is suppressed. Thus, when the relative effective refractive index difference $\Delta n_{\textit{eff(LP21)}}$ of light in the LP21 mode is less than 0.05%, the amplification of light in the LP21 mode is suppressed. Further, when the relative effective refractive index difference $\Delta n_{eff(LP21)}$ of light in the LP21 mode is less than 0.05%, the relative effective refractive index difference of light in a higher order mode is also less than 0.05%. This is because the order of LP modes of light is counted from a mode having a higher effective refractive index to a mode having a lower effective refractive index. As described above, the relative effective refractive index difference $\Delta n_{eff}$ of light in each mode is an index of light trapped inside the core. Thus, even when the refractive index profile of the amplification optical fiber is not a step-index refractive index profile, the above fact applies to an amplification optical fiber in which an active element is entirely doped to a core.

As described above, in the measurement of FIG. 3, the fiber laser device 1 illustrated in FIG. 1 in which the second optical fiber 40 is omitted is used. However, also in the fiber laser device 1 illustrated in FIG. 1 in which the second optical fiber 40 is not omitted, the beam quality $M^2$ can be made approximately 1.6 or less when the relative effective refractive index difference $\Delta n_{eff(LP11)}$ of light in the LP11 mode is less than 0.088%, that is, the relative effective refractive index difference $\Delta n_{eff(LP21)}$ of light in the LP21 mode is less than 0.05%. Further, when the relative effective refractive index difference $\Delta n_{eff(LP11)}$ of light in the LP11 mode is less than 0.05%, the beam quality $M^2$ can be made approximately 1.3 or less.

Figure 5:
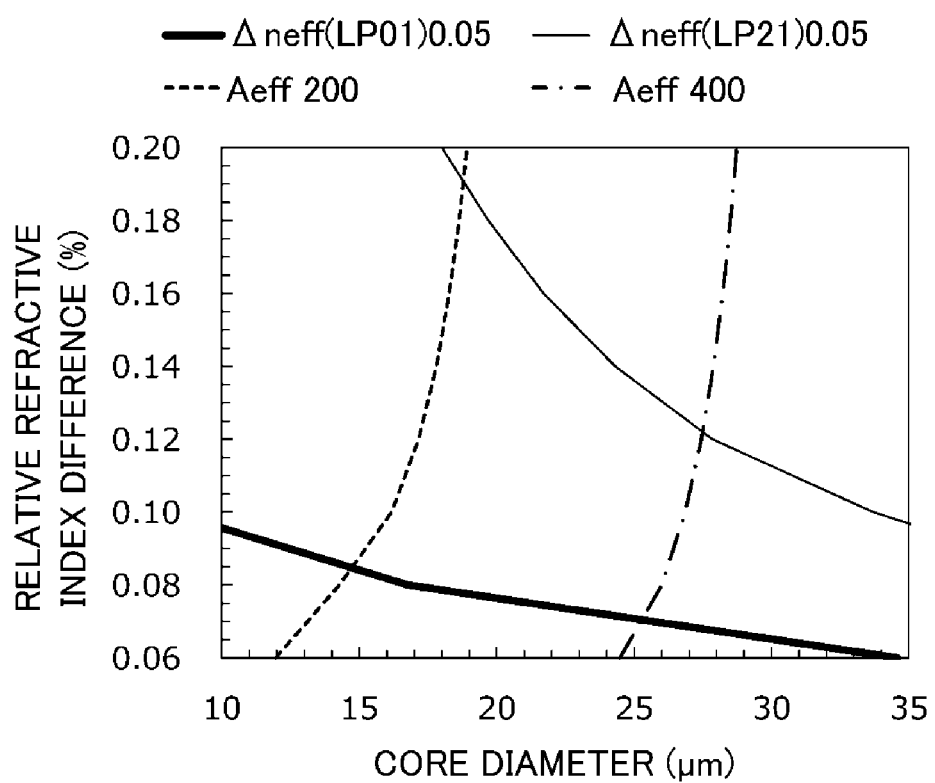
FIG. 5 is a diagram illustrating the diameter and the relative refractive index difference of the core of the optical fiber when the relative effective refractive index difference of light in the LP01 mode and the relative effective refractive index difference of light in the LP21 mode are 0.05%, and the diameter and the relative refractive index difference of the core of the optical fiber when the effective area of light in the LP01 mode is 200 µm² and 400 µm² by a simulation, according to one or more embodiments.

FIG. 5 is a diagram illustrating the diameter and the relative refractive index difference of the core of the optical fiber when the relative effective refractive index difference $\Delta n_{eff(LP01)}$ of light in the LP01 mode and the relative effective refractive index difference $\Delta n_{eff(LP21)}$ of light in the LP21 mode are 0.05%, and the diameter and the relative refractive index difference of the core of the optical fiber when the effective area $A_{eff}$ of light in the LP01 mode is 200 μm² and 400 μm² by a simulation. In the calculation of the relationship, the optical fiber is a step-index optical fiber in which the diameter of the core is 10 μm to 35 μm and the relative refractive index difference of the core is 0.06% to 0.20%. As illustrated in FIG. 5, when the diameter and the relative refractive index difference of the core 11 of the amplification optical fiber 10 fall between a line indicating that the relative effective refractive index difference $\Delta n_{eff(LP01)}$ of light in the LP01 mode is 0.05% and a line indicating that the relative effective refractive index difference $\Delta n_{eff(LP21)}$ of light in the LP21 mode is 0.05%, it is possible to amplify light in the LP01 mode and suppress the amplification of light in the LP21 or higher order mode. Thus, it can be understood that when the core 11 of the amplification optical fiber 10 has the diameter and the relative refractive index difference as described above, it is possible to prevent deterioration of the beam quality while preventing reduction in the light amplification efficiency. Further, when the effective area of light in the LP01 mode propagating through the core is 200 μm² or more, it is possible to prevent the occurrence of stimulated Raman scattering and prevent the emission of light having a wavelength different from an intended wavelength. Further, when the effective area of light in the LP01 mode propagating through the core is 400 μm² or less, it is possible to prevent light in the LP01 mode propagating through the optical fiber from shifting to light in a higher order mode and more reliably prevent deterioration of the beam quality. Thus, when the diameter and the relative refractive index difference of the core 11 of the amplification optical fiber 10 fall between a line indicating that the effective area $A_{eff}$ of light in the LP01 mode is 200 μm² and a line indicating that the effective area $A_{eff}$ of light in the LP01 mode is 400 μm², it is possible to prevent light in the LP01 mode propagating through the optical fiber from shifting to light in a higher order mode while preventing the energy density of light from becoming too high and preventing the occurrence of stimulated Raman scattering. As such an example, a core having a diameter of 20 μm and a relative refractive index difference of 0.12% can be employed as the core 11 of the amplification optical fiber 10.

Figure 6:
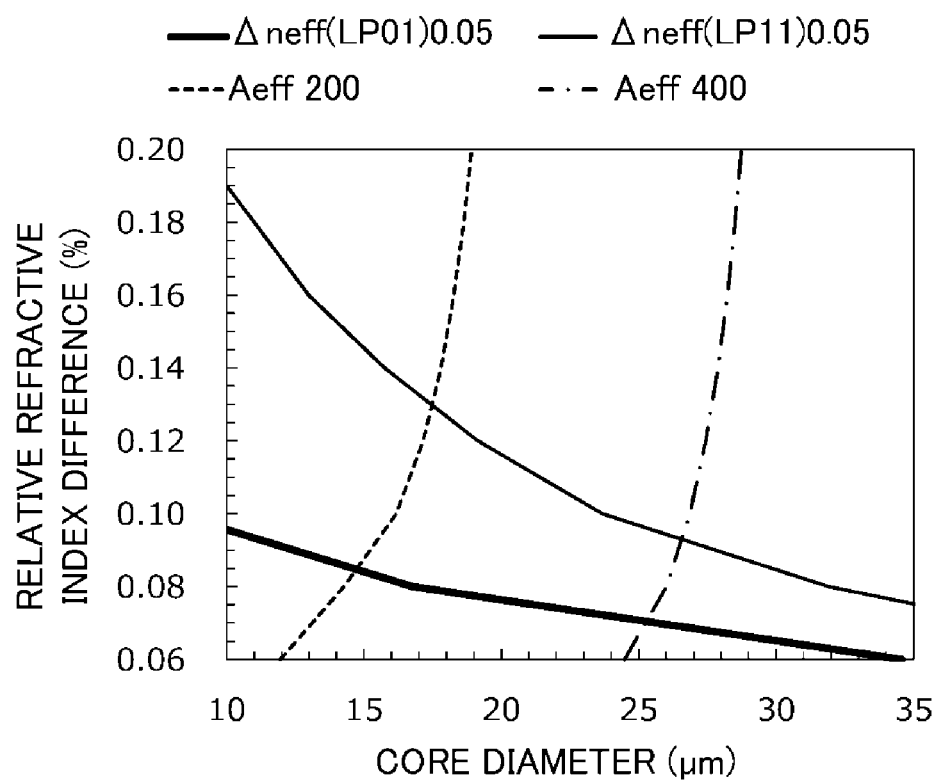
FIG. 6 is a diagram illustrating the diameter and the relative refractive index difference of the core of the optical fiber when the relative effective refractive index difference of light in the LP01 mode and the relative effective refractive index difference of light in the LP11 mode are 0.05%, and the diameter and the relative refractive index difference of the core of the optical fiber when the effective area of light in the LP01 mode is 200 µm² and 400 µm² by a simulation, according to one or more embodiments.

FIG. 5 illustrates an example of the core capable of amplifying light in the LP01 mode and suppressing the amplification of light in the LP21 or higher order mode. Further, it may be desired that light in the LP01 mode be amplified and the amplification of light in the LP11 or higher order mode be suppressed to bring light propagating through the core 11 close to the single mode. FIG. 6 is a diagram illustrating the diameter and the relative refractive index difference of the core of the optical fiber when the relative effective refractive index difference $\Delta n_{eff(LP01)}$ of light in the LP01 mode and the relative effective refractive index difference $\Delta n_{eff(LP11)}$ of light in the LP11 mode are 0.05%, and the diameter and the relative refractive index difference of the core of the optical fiber when the effective area $A_{eff}$ of light in the LP01 mode is 200 μm² and 400 μm² by a simulation. The relationship is calculated under the same conditions as the calculation of FIG. 5. As illustrated in FIG. 6, when the diameter and the relative refractive index difference of the core 11 of the amplification optical fiber 10 fall between a line indicating that the relative effective refractive index difference $\Delta n_{eff(LP01)}$ of light in the LP01 mode is 0.05% and a line indicating that the relative effective refractive index difference $\Delta n_{eff(LP11)}$ of light in the LP11 mode is 0.05%, it is possible to amplify light in the LP01 mode and suppress the amplification of light in the LP11 or higher order mode to bring light emitted from the core 11 close to the single mode. Thus, it can be understood that when the core 11 of the amplification optical fiber 10 has the diameter and the relative refractive index difference as described above, it is possible to more reliably prevent deterioration of the beam quality while preventing reduction in the light amplification efficiency. Further, also in this example, when the diameter and the relative refractive index difference of the core 11 of the amplification optical fiber 10 fall between a line indicating that the effective area $A_{eff}$ of light in the LP01 mode is 200 μm² and a line indicating that the effective area $A_{eff}$ of light in the LP01 mode is 400 μm², it is possible to prevent light in the LP01 mode propagating through the optical fiber from shifting to light in a higher order mode while preventing the energy density of light from becoming too high and preventing the occurrence of stimulated Raman scattering. As such an example, a core having a diameter of 20 μm and a relative refractive index difference of 0.10% can be employed as the core 11 of the amplification optical fiber 10.

Figure 7:
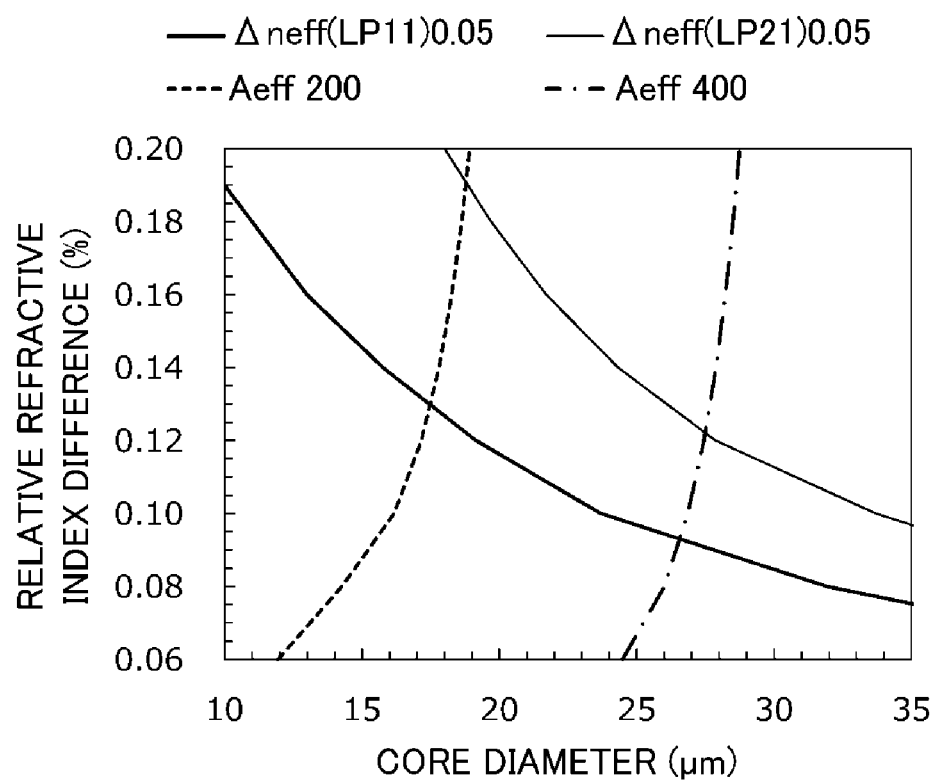
FIG. 7 is a diagram illustrating the diameter and the relative refractive index difference of the core of the optical fiber when the relative effective refractive index difference of light in the LP11 mode and the relative effective refractive index difference of light in the LP21 mode are 0.05%, and the diameter and the relative refractive index difference of the core of the optical fiber when the effective area of light in the LP01 mode is 200 µm² and 400 µm² by a simulation, according to one or more embodiments.

On the other hand, it may be desired that light in the LP01 mode and light in the LP11 mode be amplified and the amplification of light in the LP21 or higher order mode be suppressed. FIG. 7 is a diagram illustrating the diameter and the relative refractive index difference of the core of the optical fiber when the relative effective refractive index difference $\Delta n_{eff(LP11)}$ of light in the LP11 mode and the relative effective refractive index difference $\Delta n_{eff(LP21)}$ of light in the LP21 mode are 0.05%, and the diameter and the relative refractive index difference of the core of the optical fiber when the effective area $A_{eff}$ of light in the LP01 mode is 200 μm² and 400 μm² by a simulation. The relationship is calculated under the same conditions as the calculation of FIG. 5. As illustrated in FIG. 7, when the diameter and the relative refractive index difference of the core 11 of the amplification optical fiber 10 fall between a line indicating that the relative effective refractive index difference $\Delta n_{\mathit{eff}\,(LP11)}$ of light in the LP11 mode is 0.05% and a line indicating that the relative effective refractive index difference $\Delta n_{\mathit{eff}(LP21)}$ of light in the LP21 mode is 0.05%, it is possible to amplify light in the LP01 mode and light in the LP11 mode and suppress the amplification of light in the LP21 or higher order mode to emit light in a few-mode mainly including light in the LP01 mode and light in the LP11 mode from the core 11. In this case, the beam quality is deteriorated as compared to the example of FIG. 6. However, since the beam quality $M^2$ is approximately 1.5 as illustrated in FIG. 3, deterioration of the beam quality is sufficiently prevented. Thus, it can be understood that when the core 11 of the amplification optical fiber 10 has the diameter and the relative refractive index difference as described above, it is possible to prevent deterioration of the beam quality while preventing reduction in the light amplification efficiency. Further, since light in the LP11 mode is amplified in addition to light in the LP01 mode, it is possible to emit high-power light from the amplification optical fiber 10 as compared to the case of FIG. 5. Further, also in this example, when the diameter and the relative refractive index difference of the core 11 of the amplification optical fiber 10 fall between a line indicating that the effective area $A_{\mathit{eff}}$ of light in the LP01 mode is 200 μm² and a line indicating that the effective area $A_{\mathit{eff}}$ of light in the LP01 mode is 400 μm², it is possible to prevent light in the LP01 mode propagating through the optical fiber from shifting to light in a higher order mode while preventing the energy density of light from becoming too high and preventing the occurrence of stimulated Raman scattering. As such an example, a core having a diameter of 20 μm and a relative refractive index difference of 0.16% can be employed as the core 11 of the amplification optical fiber 10.

The relative refractive index difference of the core 11 may be 0.08% or more. When the relative refractive index difference of the core 11 is 0.08% or more, it is possible to stably amplify light with high resistance to disturbance even in the amplification optical fiber 10 used in a bent state. Further, it is possible to easily make the relative effective refractive index difference of light in the LP01 mode 0.05% or more. Further, the diameter of the core 11 may be 23 μm or more and 27 μm or less.

As described above relating to one or more embodiments, the active element which is pumped by pumping light is entirely doped to the core 11 of the amplification optical fiber 10 of one or more embodiments. In light propagating through the core 11, the relative effective refractive index difference of light in the LP01 mode is 0.05% or more, and the relative effective refractive index difference of light in the LP21 mode is less than 0.05%.

In the amplification optical fiber 10 including the core 11 as described above, since the active element is entirely doped to the core 11, it is possible to efficiently amplify light propagating through the core 11 as compared to an amplification optical fiber in which an active element is doped to a part of a core. Thus, it is possible to reliably prevent reduction in the light amplification efficiency as compared to an amplification optical fiber in which an active element is doped to a part of a core. Further, according to the amplification optical fiber 10 of one or more embodiments, since the relative effective refractive index difference of light in the LP01 mode propagating through the core 11 is 0.05% or more, and the relative effective refractive index difference of light in the LP21 mode propagating through the core 11 is less than 0.05%, light in the LP01 mode is amplified, and the amplification of light in the LP21 or higher order mode is suppressed. Thus, according to the amplification optical fiber 10 of one or more embodiments, it is possible to prevent deterioration of the beam quality of light to be emitted.

Further, the fiber laser device 1 of one or more embodiments is provided with the amplification optical fiber 10 as described above and the pumping light source 20 which emits pumping light which enters the amplification optical fiber 10. As described above, the amplification optical fiber 10 of one or more embodiments is capable of emitting light in which deterioration of the beam quality is prevented while preventing reduction in the light amplification efficiency. Thus, the fiber laser device 1 of one or more embodiments is capable of emitting light in which deterioration of the beam quality is prevented while preventing reduction in the light amplification efficiency.

Next, alternative embodiments of the present invention will be described in detail with reference to FIG. 8. Note that elements identical or equivalent to those in the previously-described embodiments will be denoted by the same reference signs unless otherwise specifically noted, and redundant description may be omitted.

Figure 8:
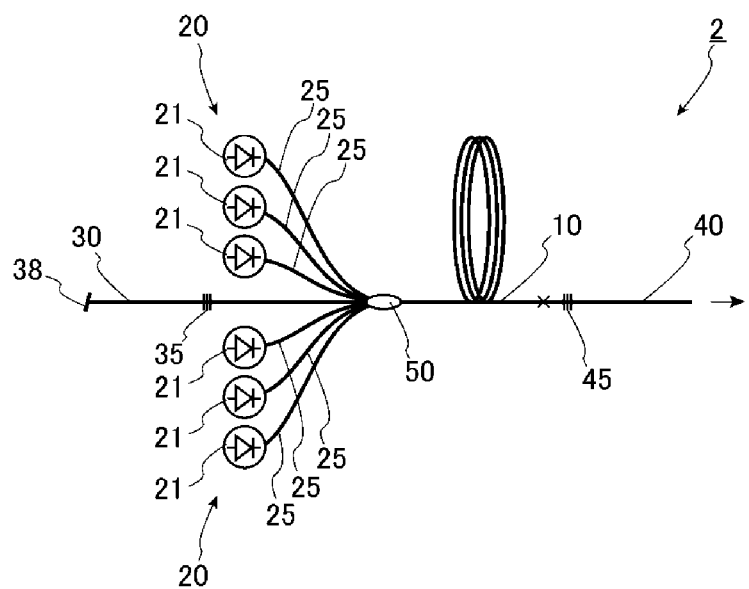
FIG. 8 is a diagram illustrating a fiber laser device according to one or more embodiments of the present invention.

FIG. 8 is a diagram illustrating a fiber laser device of one or more embodiments. The fiber laser device 2 of one or more embodiments differs from the fiber laser device 1 in that the fiber laser device 2 is a resonator fiber laser device which is not provided with the seed light source 60, and provided with a first FBG 35, as a first mirror, which is disposed on a core of a first optical fiber 30 and a second FBG 45, as a second mirror, which is disposed on a core of a second optical fiber 40.

The core of the first optical fiber 30 of one or more embodiments differs from the core of the previously-described first optical fiber 30 in that the diameter of the core of the first optical fiber 30 of one or more embodiments is equal to the diameter of a core 11 of an amplification optical fiber 10. As described above, the first FBG 35 is disposed on the core of the first optical fiber 30. The first FBG 35 disposed in this manner is optically coupled to the core 11 of the amplification optical fiber 10 on one side of the amplification optical fiber 10. In the first FBG 35, a high refractive index part having a refractive index higher than the refractive index of a part other than the first FBG 35 in the core of the first optical fiber 30 and a low refractive index part having a refractive index similar to the refractive index of the part other than the first FBG 35 in the core of the first optical fiber 30 are periodically repeated in the longitudinal direction of the core of the first optical fiber 30. The first FBG 35 reflects at least part of light having some wavelengths emitted by an active element doped to the core 11 of the amplification optical fiber 10 when the active element is brought into a pumped state, for example, light including a wavelength of 1060 nm. Further, the reflectivity of the first FBG 35 is higher than the reflectivity of the second FBG 45 (described below) and reflects at least part of light having some wavelengths emitted by the active element with a reflectivity of, for example, 99% or more. Further, a termination unit 38 which converts light into heat is disposed on the first optical fiber 30 at an end opposite to the side connected to amplification optical fiber 10.

Further, as described above, the second FBG 45 is disposed on the core of the second optical fiber 40. In this manner, the second FBG 45 is optically coupled to the core 11 of the amplification optical fiber 10 on the other (opposite) side of the amplification optical fiber 10. The second FBG 45 includes a high refractive index part and a low refractive index part which are periodically repeated in a manner similar to the first FBG 35. The second FBG 45 is configured to reflect light including a wavelength reflected by the first FBG 35 with a reflectivity lower than the reflectivity of the first FBG 35. When light reflected by the first FBG 35 enters the second FBG 45, the second FBG 45 reflects the light with a reflectivity of, for example, approximately 10%.

In this manner, the first FBG 35, the amplification optical fiber 10, and the second FBG 45 constitute a resonator. In the example of FIG. 8, the first FBG 35 is disposed at the side opposite to the amplification optical fiber 10 with respect to an optical combiner 50. However, the first FBG 35 may be disposed at the same side as the amplification optical fiber 10 with respect to the optical combiner 50, and the amplification optical fiber 10 may be interposed between the first FBG 35 and the second FBG 45.

Next, the action of the fiber laser device 2 will be described.

First, pumping light is emitted from each laser diode 21 of a pumping light source 20. The pumping light enters an inner cladding 12 of the amplification optical fiber 10 through an optical fiber 25 and mainly propagates through the inner cladding 12. The pumping light propagating through the inner cladding 12 pumps ytterbium doped to the core 11 when passing through the core 11. The ytterbium in a pumped state emits spontaneous emission light in a specific wavelength band. Light including a predetermined wavelength, for example, a wavelength of 1060 m reflected by both of the first FBG 35 and the second FBG 45 resonates between the first FBG 35 and the second FBG 45 with the spontaneous emission light. When the resonating light propagates through the core 11 of the amplification optical fiber 10, ytterbium in a pumped state causes stimulated emission, and the resonating light is amplified. Part of the resonating light passes through the second FBG 45, and is emitted from the second optical fiber 40. Then, when a gain and a loss become equal to each other in the resonator including the first FBG 35, the amplification optical fiber 10, and the second FBG 45, a laser oscillation state is established, and light having a certain power is emitted from the second optical fiber 40.

Most part of the light passing through the first FBG from the amplification optical fiber 10 side is converted to heat in the termination unit 38 and disappears.

As described above, the amplification optical fiber is capable of preventing deterioration of the beam quality while preventing reduction in the light amplification efficiency. Thus, the fiber laser device 2 of one or more embodiments is capable of emitting light in which deterioration of the beam quality is prevented while preventing reduction in the light amplification efficiency in a manner similar to the previously-described fiber laser device 1.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

For example, in the above embodiments, the double cladding fiber including the inner cladding 12 which surrounds the outer peripheral face of the core 11 and the outer cladding 13 which surrounds the outer peripheral face of the inner cladding 12 has been described as an example of the amplification optical fiber 10, and the fiber laser device 1, 2 in which the pumping light enters the inner cladding 12 has been described as an example. However, the amplification optical fiber and the fiber laser device of the present invention are not limited thereto. For example, the amplification optical fiber need not necessarily include the outer cladding as long as the amplification optical fiber includes a core and a cladding. In this case, in the fiber laser device, the pumping light may enter the core of the amplification optical fiber to pump the active element.

As described above, one or more embodiments of the present invention provide the amplification optical fiber, the fiber laser device, and the optical resonator that are capable of preventing deterioration of the beam quality while preventing reduction in the light amplification efficiency, and the use of the amplification optical fiber, the fiber laser device, and the optical resonator in a processing laser device is expected.

The invention claimed is:

1. An amplification optical fiber comprising:
a core;
a cladding having a refractive index lower than a refractive index of the core, wherein
an active element pumped by pumping light is entirely doped to the core, and
a relative effective refractive index difference of light in an LP01 mode is greater than or equal to 0.05% and a relative effective refractive index difference of light in an LP21 mode is less than 0.05% in light propagating through the core.

2. The amplification optical fiber according to claim 1, wherein a relative effective refractive index difference of light in an LP11 mode is less than 0.05% in light propagating through the core.

3. The amplification optical fiber according to claim 1, wherein a relative effective refractive index difference of light in an LP11 mode is greater than or equal to 0.05% in light propagating through the core.

4. The amplification optical fiber according to claim 1, wherein a refractive index profile of the core corresponds to a concentration profile of the active element.

5. The amplification optical fiber according to claim 1, wherein an effective area of light in the LP01 mode propagating through the core is greater than or equal to 200 $\mu m^2$.

6. The amplification optical fiber according to claim 5, wherein the effective area of light in the LP01 mode propagating through the core is less than or equal to 400 $\mu m^2$.

7. The amplification optical fiber according to claim 1, wherein a relative refractive index difference of the core is greater than or equal to 0.08%.

8. The amplification optical fiber according to claim 1, wherein the active element is ytterbium.

9. The amplification optical fiber according to claim 1, wherein a diameter of the core is greater than or equal to 23 $\mu m$ and less than or equal to 27 $\mu m$.

10. A fiber laser device comprising:
the amplification optical fiber according to claim 1; and
a pumping light source that emits the pumping light that enters the amplification optical fiber.

11. An optical resonator comprising:
the amplification optical fiber according to claim 1;
a first mirror that is optically coupled to the core of the amplification optical fiber on one side of the amplification optical fiber and reflects at least part of light having wavelengths emitted by the active element in a pumped state; and
a second mirror that is optically coupled to the core of the amplification optical fiber on the opposite side of the amplification optical fiber and reflects at least part of light having wavelengths reflected by the first mirror with a reflectivity lower than a reflectivity of the first mirror.

\* \* \* \* \*